United States Patent
Morioka (10) Patent No.: US 7,737,659 B2
(45) Date of Patent: Jun. 15, 2010

(54) BATTERY CHARGING METHOD

(75) Inventor: Toru Morioka, Awaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 230 days.

(21) Appl. No.: 11/812,893

(22) Filed: Jun. 22, 2007

(65) Prior Publication Data

US 2008/0007223 A1 Jan. 10, 2008

(30) Foreign Application Priority Data

Jun. 23, 2006 (JP) .............................. 2006-173673

(51) Int. Cl.
*H02J 7/00* (2006.01)
(52) U.S. Cl. .................. 320/128; 320/137; 320/132
(58) Field of Classification Search ................. 320/149, 320/139, 128
See application file for complete search history.

(56) References Cited

U.S. PATENT DOCUMENTS

| | | | |
|---|---|---|---|
| 7,202,635 B2 * | 4/2007 | Patino et al. ................. | 320/160 |
| 7,394,224 B2 * | 7/2008 | Wanibuchi et al. ........... | 320/149 |
| 2004/0222768 A1 * | 11/2004 | Moore et al. ................. | 320/128 |
| 2005/0134231 A1 * | 6/2005 | Cho ............................ | 320/141 |

FOREIGN PATENT DOCUMENTS

| | | |
|---|---|---|
| JP | 9-120843 | 5/1997 |
| JP | 2000-270491 | 9/2000 |
| JP | 2001-243990 | 9/2001 |
| JP | 2005-192383 | 7/2005 |
| JP | 2005-278334 | 10/2005 |

* cited by examiner

*Primary Examiner*—Edward Tso
*Assistant Examiner*—Ahmed Omar
(74) *Attorney, Agent, or Firm*—Wenderoth, Lind & Ponack, L.L.P.

(57) ABSTRACT

A battery charging method that charges a battery to a full charged state at a specified voltage. In the battery charging method, the battery is charged to the full charged state at the specified voltage that decreases as battery charging/discharging processes are repeated.

7 Claims, 6 Drawing Sheets

BATTERY CHARGING METHOD

BACKGROUND OF THE INVENTION

1. Field of the Invention

The present invention relates to a battery charging method, and particularly to a battery charging method that can increase the maximum charging capacity of a battery and additionally can increase life of the battery.

2. Description of the Related Art

Recently, a battery charging method that charges a battery to a full charged state at a specified voltage is used to charge lithium-ion rechargeable batteries. In a lithium-ion rechargeable batteries rises, a charging process is conducted so that a lithium ion battery is charged initially at a constant current and is then charged at a constant voltage to a full charged state. The initial charging process part is conducted until a battery voltage reaches the specified voltage. After the battery voltage reaches the specified voltage, the process is changed to the constant voltage charging process part so that the battery voltage does not rise. The reason is to prevent that the voltage of a battery to be charged does not exceed the specified voltage. In the constant voltage charging process part in which the battery is charged with its voltage being held at the specified voltage, a battery charging current gradually decreases. When the charging current becomes smaller than a specified value, it is determined that the battery is fully charged, thus, the charging process is completed. In lithium-ion rechargeable batteries, their specified voltage is specified so that the voltage of a battery in the full-charged state becomes 4.1 V/cell to 4.2 V/cell, for example.

Figure 1:
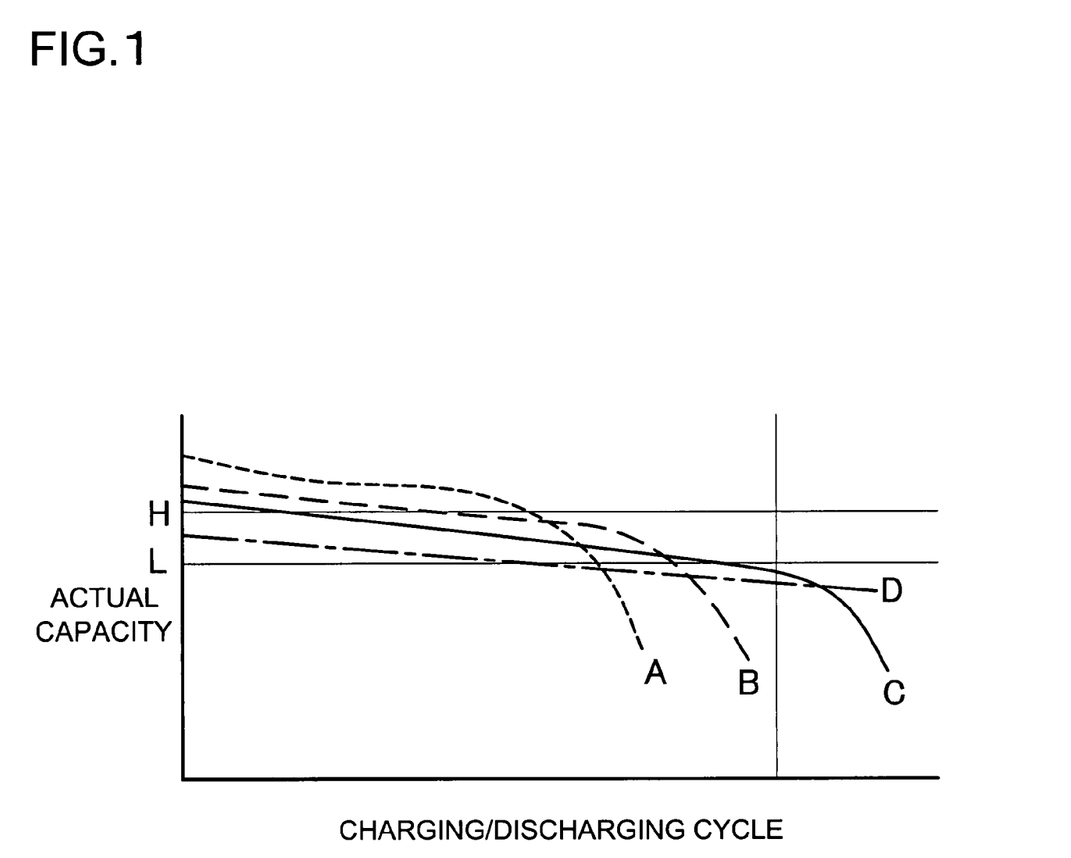
FIG. 1 is a graph showing the actual capacity and the cycle life in a lithium-ion rechargeable batteries.

In the aforementioned method that charges a battery to the full charged state at a limited voltage, the degree of a specified voltage affects an actual capacity that actually discharges the batteries, and life of the battery. FIG. 1 is a graph showing the actual capacity and the cycle life of a lithium-ion rechargeable battery. In this graph, the horizontal axis shows the charging/discharging process cycle, and the vertical axis shows the actual capacity. This graph clearly shows in the case where the specified voltage is set high, the initial capacity of the battery can be high. On the other hand, if the specified voltage is set high so that the battery is fully charged to a high full-charged voltage, the life of the battery decreases. In FIG. 1, properties A, B, C and D show the properties of lithium-ion rechargeable batteries that are charged at different specified voltages. The property A battery is charged at a specified voltage that is set high. The property A battery has a high initial actual capacity, but its cycle life decreases. Conversely, the property B, C and D batteries are charged at specified voltages that decrease in this order, thus, their initial actual capacities decrease, but the length of their cycle life increases. These properties in this Figure show the actual capacity and the cycle life are mutually contradictory. If a specified voltage is set high so that an actual capacity increases, cycle life decreases. On the other hand, if a specified voltage is set low so that life cycle increases, an actual capacity decreases. Accordingly, one of actual capacity and cycle life is improved, the other deteriorates. Both of them cannot be satisfied.

To improve the life property of a battery, methods have been developed which charge a battery at a specified voltage that increases as charging/discharging processes are repeated (see Japanese Laid-Open Publications Nos. H09-120843, 2000-270491, and 2005-278334).

SUMMARY OF THE INVENTION

In the charging methods disclosed in these Patent Documents, a battery is charged at a specified voltage that increases as battery deteriorates caused by increase of the number of charging/discharging process cycles. When a lithium-ion rechargeable battery is charged at a specified voltage that is set high, the actual capacity of the battery increases. However, when a battery has a deteriorated electrical property caused by increase of the number of charging/discharging process cycles, the remaining life of the battery is short. Accordingly, if such a deteriorating battery is charged at a specified voltage that is set high, as the battery further deteriorates, high voltage charging accelerates deterioration of the battery. As a result, the remaining life of the battery becomes much shorter. Since even a new battery likely deteriorates when charged to a high voltage, if a battery that has a deteriorated electrical property caused by increase of the number of charging/discharging process cycles is charged at a specified voltage that is set high, as is normal, the deterioration of the battery is accelerated, and the remaining life of the battery becomes much shorter. For this reason, if a battery that is used for a number of charging/discharging cycles is charged at a specified voltage that is set high, the actual capacity of the battery can temporarily increase, but the battery will deteriorate very much. As a result, the actual capacity of the battery sharply decreases. Consequently, the method that charges a battery at a specified voltage that is set high as battery charging/discharging processes are repeated can temporarily increase the actual capacity of the battery, but cannot increase the total life of the battery so much.

The present invention has been developed for solving the problem that it is very difficult to increase an actual capacity and battery life that are mutually contradictory. An important object of the present invention is to provide a battery charging method that increases the initial actual capacity of a battery, and additionally increases the life of the battery.

To achieve the aforementioned object, a battery charging method according to the present invention includes the following features.

A battery charging method according to an aspect of the present invention charges a battery to a full charged state at a specified voltage. In the battery charging method, the battery is charged to the full charged state at the specified voltage that decreases as battery charging/discharging processes are repeated.

Since the aforementioned battery charging method charges a battery in an ideal condition, the battery charging method increases the initial actual capacity of the battery and additionally increases the life of the battery, and thus, increases the actual capacity and the life of the battery that are mutually contradictory. The reason is that, in the battery charging method, the battery is charged to the full charged state at the specified voltage that decreases as battery charging/discharging processes are repeated. In the charging method according to the present invention, dissimilarly to the known methods, the battery is charged not at a specified voltage that increases as battery charging processes are repeated. In the battery charging method according to the present invention, the battery is charged at a specified voltage that decreases as battery charging/discharging processes are repeated contrary to the known methods. In the case of a new battery, the battery is charged at the specified voltage that is set high so that the actual capacity of the battery increases. On the other hand, when the battery has a deteriorated electrical property caused by repetitions of charging/discharging processes, and thus likely deteriorates, the battery is charged at the specified voltage that is set low to keep the deterioration in check. For this reason, it is possible to increase the initial actual capacity of a battery, and additionally to effectively keep the deterioration of the battery in check so that the life of the battery can be long.

In a battery charging method according to another aspect of the present invention, the battery can be charged in a constant current charging manner in a constant voltage charging so that the voltage of the battery reaches the specified voltage, and is then charged at the specified voltage in a constant voltage charging manner.

In a battery charging method according to another aspect of the present invention, the battery to be charged can be a lithium-ion rechargeable battery.

In a battery charging method according to another aspect of the present invention, a charging or discharging capacity amounts can be integrated in the battery charging or discharging process, and the specified voltage can decrease as a value of the integrated capacity amounts increases.

In a battery charging method according to another aspect of the present invention, the number of the battery charging/discharging processes can be counted, and the specified voltage can decreases as the counted number of the battery charging/discharging processes increases.

In a battery charging method according to another aspect of the present invention, after the battery is charged in the specified voltage decreasing operation in which the specified voltage decreases as the battery charging/discharging processes are repeated, the battery can be charged in constant voltage charging operation in which the specified voltage is a constant voltage and does not vary.

In a battery charging method according to another aspect of the present invention, the battery can be charged in the specified voltage decreasing operation in which the specified voltage decreases over its life.

In a battery charging method according to another aspect of the present invention, in the specified voltage decreasing operation, the specified voltage can decrease at a constant rate. In addition, in a battery charging method according to another aspect of the present invention, in the specified voltage decreasing operation, the specified voltage can decrease at a rate that gradually decreases.

In a battery charging method according to another aspect of the present invention, in the specified voltage decreasing operation, when the charging/discharging capacity amount of the battery to be charged/discharged reaches the capacity rating of the battery, the specified voltage can decrease by a voltage in the range from 0.1 mV to 10 mV.

In a battery charging method according to still another aspect of the present invention, after the battery charging/discharging processes are repeated so that the battery charging process is conducted in constant voltage charging operation in which the battery is charged at the specified voltage as a constant voltage, the battery charging process is conducted in constant voltage charging operation in which the battery is charged at the specified voltage as a second constant voltage smaller than said constant voltage.

This charging method also has effects similar to the aforementioned effects.

The above and further objects of the present invention as well as the features thereof will become more apparent from the following detailed description to be made in conjunction with the accompanying drawings.

DETAILED DESCRIPTION OF THE INVENTION

Dissimilarly to the known methods, in a battery charging method according to the present invention, a battery is charged not at a specified voltage that increases as battery charging/discharging processes are repeated. In the charging method according to the present invention, the battery is charged at a specified voltage that decreases as battery charging/discharging processes are repeated contrary to the known methods. That is, in the charging method according to the present invention, in the case of a new battery, the battery is charged at the specified voltage that is set high so that the actual capacity of the battery increases. On the other hand, when the battery has a deteriorated electrical property caused by repetitions of charging/discharging processes, and thus likely deteriorates, the battery is charged at the specified voltage that is set low to keep the deterioration in check. In this method, although in the case of a new battery, the actual capacity of the battery increases, when the battery is likely deteriorates, the battery is charged at a voltage that keeps the deterioration in check.

A rechargeable battery is charged to a full charged state. Generally, there are two types of methods that determine the full charged state of a battery. In a first method, as in the case of nickel-hydrogen batteries and nickel-cadmium batteries, when the peak value of the voltage of a battery to be charged, or reduction $\Delta V$ that drops from the peak value is detected, the battery is determined as in the full-charged state. In a second method, as in the case of lithium-ion rechargeable batteries, a battery is charged at the specified voltage in a constant voltage charging manner so that the battery is charged at a limited battery voltage, and, when a charging current decreases, the battery is determined as in the full charged state. Since, in the present invention, a battery is charged to the full charged state so that its battery voltage is limited, the present invention is suitable for lithium-ion rechargeable batteries that can be determined as in the full charged state based on the second method. However, a battery that is charged in the present invention is not limited to a lithium-ion rechargeable battery.

The present invention can be applied to all batteries that are charged in a constant charging manner at a specified voltage as a voltage to which a battery is charged.

A battery to be charged is illustrated as a lithium-ion rechargeable battery to show an exemplary practical charging voltage for sake of understanding.

Figure 2:
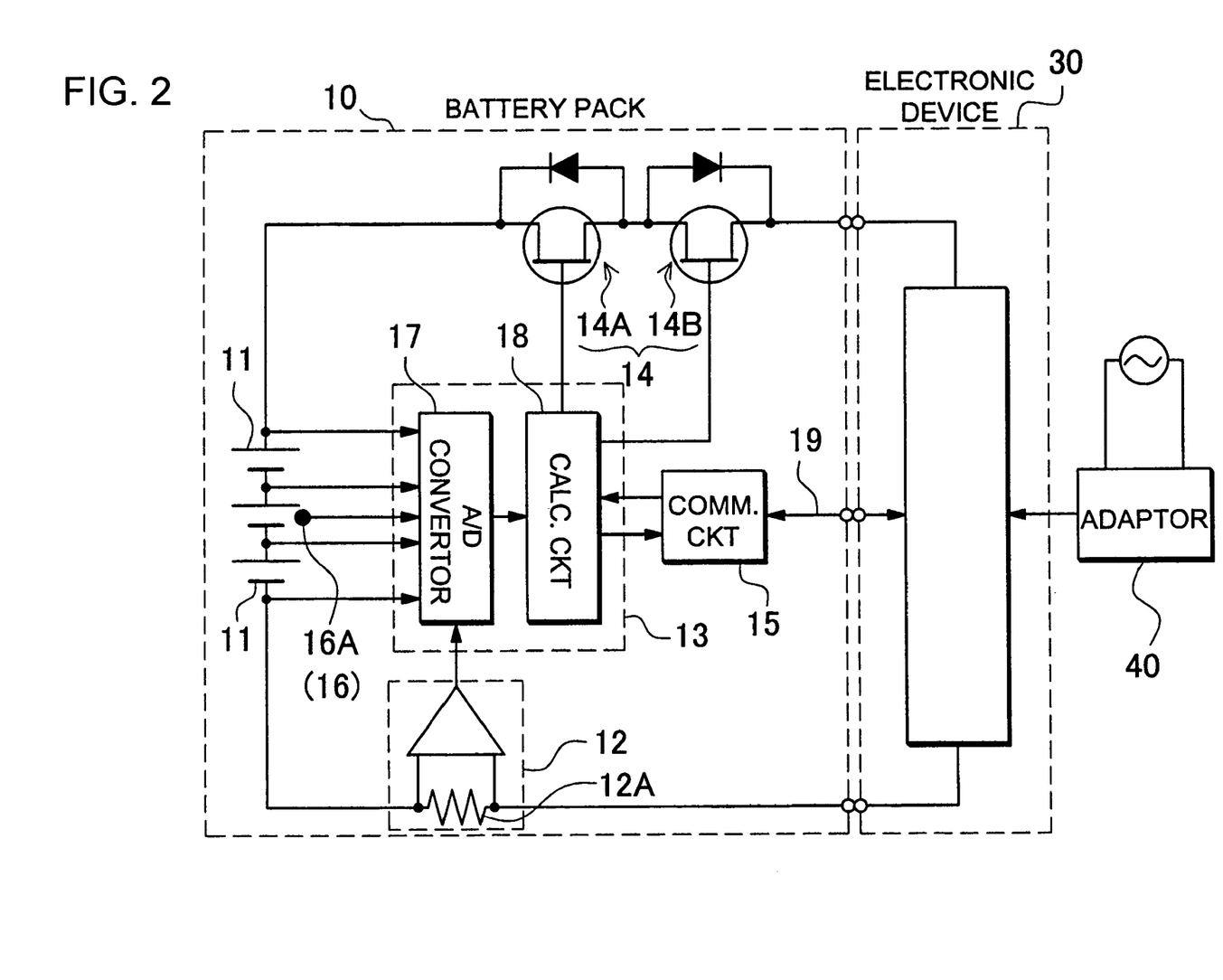
FIG. 2 is a circuit diagram showing an exemplary battery pack that is charged by a battery charging method according to one embodiment of the present invention.

FIG. 2 shows a battery pack 10 that is charged by the charging method according to the present invention. FIG. 2 is a view showing the battery pack 10 that is mounted to an electronic device 30. The electronic device 30 is a mobile device PC. The battery pack 10 is charged by the mobile device PC as the electronic device 30, and supplies power to the mobile device PC. The mobile device PC is a mobile personal computer such as a note type personal computer. Typically, the battery pack 10 is detachably attached to the mobile device PC. However, the battery pack may be installed not to be detached from the mobile device PC as a power supply for the mobile device PC. The mobile device PC is connected to an adapter 40 that coverts commercial alternating-current power through a wall outlet into direct-current power. The adapter 40 supplies direct-current electric power to the mobile device PC. The mobile device PC includes a power supply circuit (not shown) that controls electric power that is supplied from an adapter 40. The output of the power supply circuit charges the batteries pack 10, and also supplies electric power to a load of the mobile device PC. In addition, in the case where electric power is not supplied from the adapter 40, the battery pack 10 supplies electric power to the mobile device PC.

The battery pack 10 includes rechargeable batteries 11, a current detection portion 12, a control circuit 13, switching elements 14, and a communication circuit 15. The battery 11 is composed of a lithium-ion rechargeable battery. The current detection portion 12 includes a current detection resistor 12A that detects a current in battery 11 charging/discharging processes. The control circuit 13 includes a microprocessor unit (hereinafter referred to as "MPU") that monitors and controls the battery 11 charging/discharging processes. The switching elements 14 are turned ON/OFF by the control circuit 13 to control a current that flows through the batteries 11. The communication circuit 15 communicates with the mobile devices PC. In addition, the battery pack 10 shown in the Figure includes a temperature detection portion 16 that includes a temperature sensor 16A of a thermistor that is thermally coupled to the batteries 11.

An A/D converter 17 and a calculation circuit 18 are installed in the control circuit 13. The A/D converter 17 converts analog signals of a battery 11 voltage, an output from the current detection portion 12, and an output from the temperature detection portion 16 into digital signals, and provides the digital signals to the calculation circuit 18. The calculation circuit 18 performs calculation processing on the digital signals that are provided from the A/D converter 17, and turns the switching elements 14 ON/OFF. The calculation circuit 18 integrates battery 11 charging/discharging current amounts, and calculates the remaining capacity of the battery. In addition, the calculation circuit 18 determines the full charged state based on the battery 11 voltage, and controls the switching element 14. Additionally, when determining abnormality of a current that flows through the batteries 11, a temperature, a voltage and the like, the calculation circuit 18 turns the switching elements 14 OFF, and thus cuts off the current to protect the batteries 11.

The switching elements 14 are FETs. FETs have a body diode. FETs that have a body diode allow a current to flow in the reverse direction in an OFF state through the body diode. The switching element 14 of FETs includes a discharging switching element 14A that cuts off a discharge current of the batteries 11, and a charging switching element 14B that cuts off a charging current of the batteries 11.

When a discharging battery 11 voltage drops to the minimum voltage, the control circuit 13 turns the discharging switching element 14A OFF from ON to cut off a discharging battery 11 current. The discharging switching element 14A that is turned in the OFF state allows the charging current to flow through its body diode. For this reason, when the charging current flows and the battery 11 voltage rises, the discharging switching element 14A is turned ON from OFF so that the batteries 11 can be discharged again.

When turned OFF from ON by the control circuit 13, the charging switching element 14B controls the charging battery 11 current to charge the batteries 11 to the full charged state. When the batteries 11 are fully charged, the charging switching element 14B is held OFF. The charging switching element 14B in the OFF state allows the discharging current to flow through its body diode. For this reason, when the discharging current flows and the battery 11 voltage drops, the charging switching element 14B is turned ON from OFF. The charging switching element 14B in the ON state has an internal resistance smaller than its body diode. For this reason, the voltage drop of a discharging current is small. Accordingly, in the state where heat generation is kept in check in the charging switching element 14B, the batteries 11 effectively supply power to the load of the mobile device PC.

Figure 3:
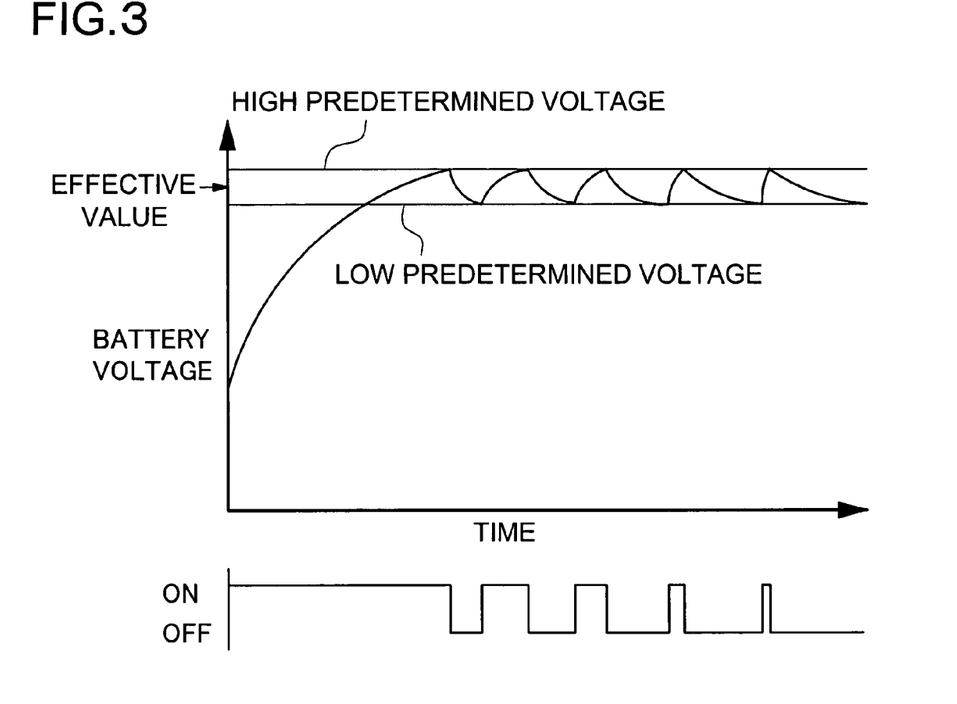
FIG. 3 is a view showing one example in which the battery is charged by turning charging/discharging switching elements ON/OFF to a full charged state.
Figure 4:
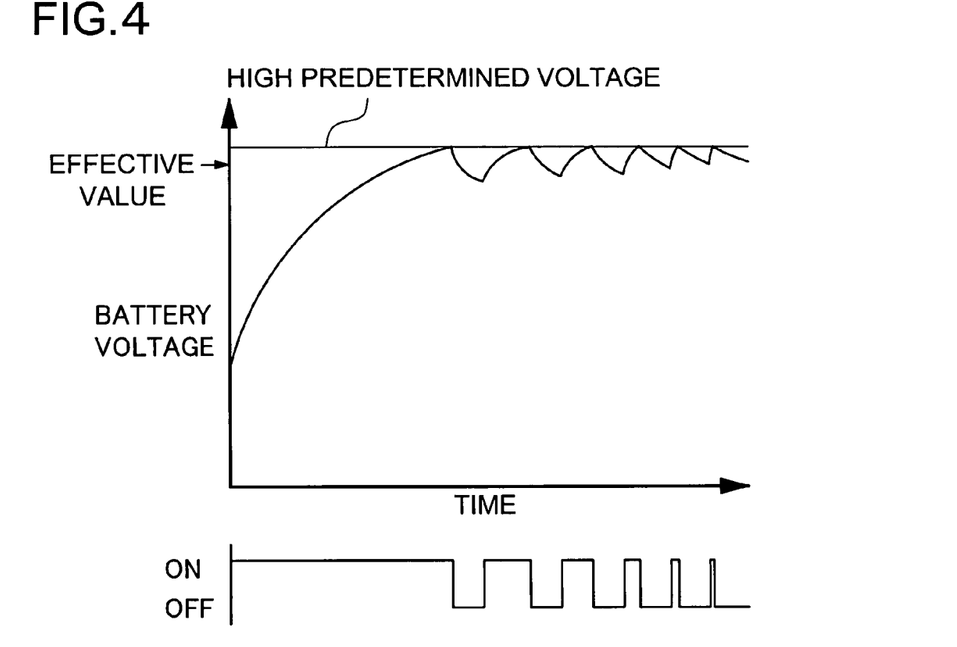
FIG. 4 is a view showing another example in which the battery is charged by turning charging/discharging switching elements ON/OFF to a full charged state.

In a battery 11 charging process, the control circuit 13 controls the charging switching element 14B. In the case where the battery 11 voltage is lower than a specified voltage, the control circuit 13 holds the charging switching element 14B in the ON state, and charges the batteries 11 at a constant current. When the battery 11 voltage reaches the specified voltage, the control circuit 13 turns the charging switching element 14B ON/OFF to charge the batteries 11 in a pulse charging manner. In addition, the control circuit 13 has a feature that reduces the specified voltage of a charging voltage as discussed below. In the pulse charging process part, the charging switching element 14B is turned ON/OFF, thus, the batteries 11 are charged at a constant voltage to the full charged state so that the effective value of the battery 11 charging voltage does not exceed the specified voltage. That is, in the pulse charging process part, when battery 11 voltage reaches a high predetermined voltage, the charging switching element 14B is turned OFF, after that, when battery 11 voltage drops to a low predetermined voltage, or when a certain period of time elapses, the charging switching element 14B is turned ON again. The charging switching element 14B is thus turned ON/OFF repeatedly to charge the batteries 11 to the full charged state. FIGS. 3 and 4 show this charging process part.

FIG. 3 shows that, when the battery voltage reaches the high predetermined voltage, the charging switching element 14B is turned OFF, after that, when the battery voltage drops to the low predetermined voltage, the switching element 14B is turned to ON again to charge the batteries. Thus, the effective value of charging voltage is roughly the center value of the high and low predetermined voltages, and more particularly is about average value of the high and low predetermined voltages. That is, the batteries 11 are charged at the effective value of charging voltage that is the specified voltage. In the case of this type of pulse charging process part, both the high and low predetermined voltages are reduced by the same voltage value each, thus, the charging voltage specified value can be also reduced by the same voltage value. For example, to reduce the specified voltage of charging voltage by 1 mV, both the high and low predetermined voltages are reduced by 1 mV each. FIG. 4 shows that, when the battery voltage reaches the high predetermined voltage, the charging switching element 14B is turned OFF, after that, when certain periods of time elapse, the switching element 14B is turned to ON so that the batteries 11 are charged at the effective value of the battery 11 charging voltage that meets the specified voltage.

As the charging switching element 14B is turned ON/OFF in the pulse charging manner, an average current decreases. In addition, as the batteries 11 is charged to the full charged state, the average current further decreases. When the average current decreases to a predetermined value, the control circuit determines that the batteries 11 are fully charged, and thus completes the charging process. As shown in FIG. 2, the control circuit 13 controls the charging switching element 14B to charge the battery pack 10 with a plurality of serially connected batteries 11 so that the voltage of a battery that is charged to the highest battery voltage does not exceed the specified voltage, or the total voltage of the serially connected batteries 11, i.e., the output voltage of the battery pack 10, does not exceed the specified voltage. In the thus-operated pulse charging process part, it is possible to reduce the effective value of charge voltage that is applied to the batteries 11, in other words, it is possible to reduce the specified voltage at which the batteries 11 are charged.

As discussed above, the control circuit 13 effectively and quickly charges the batteries at a constant current in the case where the battery voltage is low state until the battery voltage does not rise to the specified voltage. In the charging method according to the present invention, it is preferable that the batteries are charged at a constant current in an initial period in which the charging process starts, in other words, until the battery voltage reaches the specified voltage, and is then charged at a constant voltage to the full charged state. In this case, it is possible to quickly and effectively charge the batteries to the full charged state. However, in the charging method according to the present invention, the batteries may be charged at a constant voltage from the beginning of the charging process.

Figure 5:
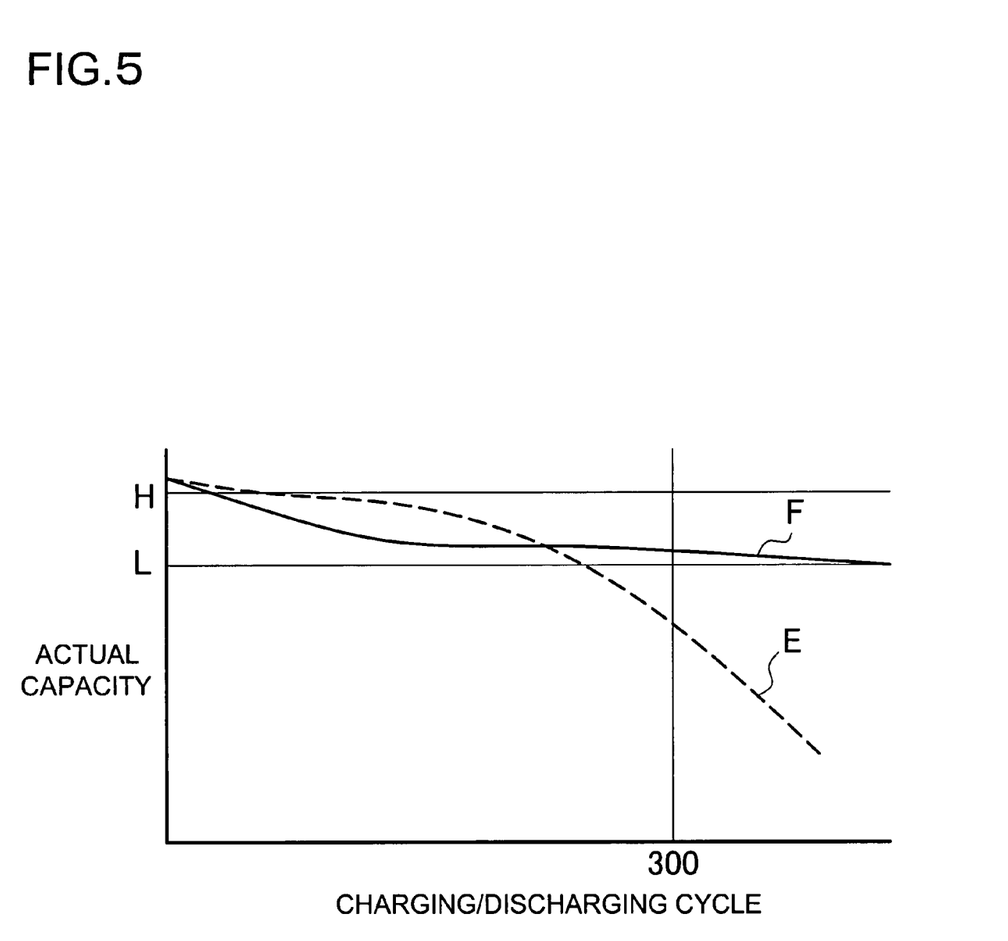
FIG. 5 is a graph showing the state where the cycle life varies depending on batteries that are fully charged.

If the control circuit 13 sets a high voltage at which the batteries 11 are charged to the full charged state, this setting can increase the actual capacity that is supplied by the batteries 11 until they are fully discharged, but battery 11 life decreases. FIG. 5 is a graph showing the state where the cycle life varies depending on batteries that are charged to the full charged state. This graph shows that the actual capacity drops with repetition of the charging/discharging processes. In this graph, a curved line E shows the cycle life of a battery that is charged to a constant battery voltage by a conventional charging method. A curved line F shows the cycle life of a battery that is charged to a varying battery voltage by the charging method according to the present invention. The curved line F shows the actual capacity variation of the battery that is charged to a battery voltage that decreases with repetition of the charging/discharging processes. In other words, the curved line F shows the actual capacity variation of the battery that is charged in a constant charging manner at the specified voltage that decreases with repetition of battery charging/discharging processes. As shown by the curved line F is this graph, the charging method according to the present invention can increase the battery life very much as compared with the conventional method (curved line E) that charges the batteries to a fixed constant battery voltage as the full charged state.

The control circuit changes the specified voltage of a battery to be charged with repetition of the charging/discharging processes as shown in FIGS. 6 to 9. These graphs show the battery state with repetition of the charging/discharging processes as a function of battery charging/discharging cycle. The control circuit increments a cycle counter value when the batteries are fully discharged after fully charged from the full discharged state, that is, from a remaining capacity of 0%.

Figure 6:
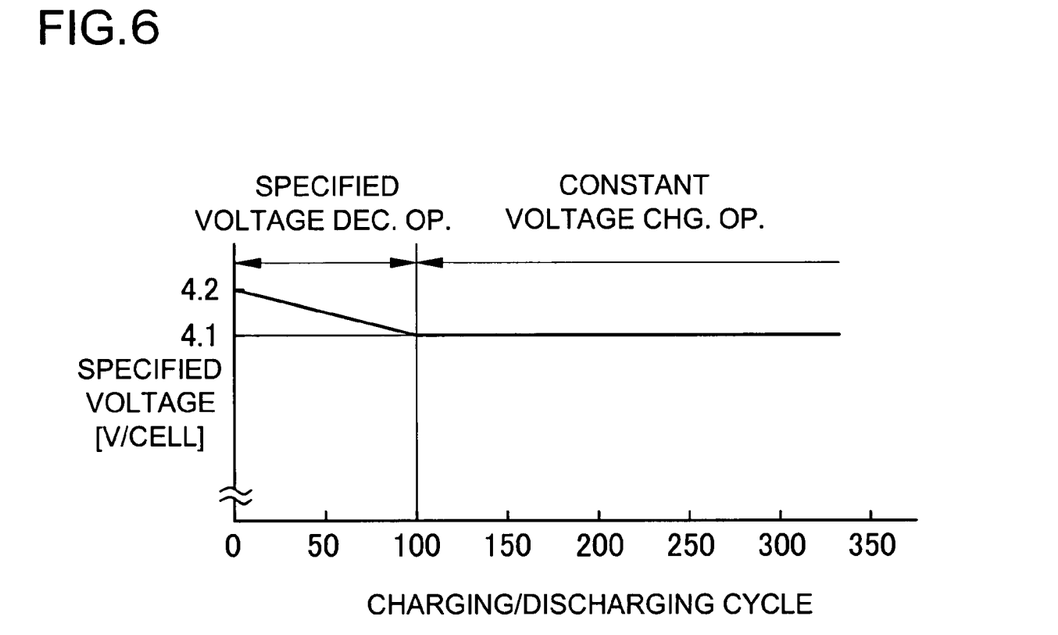
FIG. 6 is a view showing one example in which a specified voltage decreases with repetition of battery charging/discharging processes.

As shown in FIG. 6, the control circuit that changes the specified voltage of a battery to be charged charges the batteries in a specified voltage decreasing operation in which the specified voltage decreases as the charging/discharging processes are repeated, in other words, as the charging/discharging cycle counter value increases. After that, the control circuit charges the batteries in a constant voltage charging operation in which the specified voltage is a constant voltage and does not vary.

In this charging method, until the charging/discharging cycle counter value reaches a predetermined value, e.g., 100, the batteries are charged in the specified voltage decreasing operation in which the specified voltage gradually decreases. In the specified voltage decreasing operation, the specified voltage is initially set to 4.2 V, and then decreases by 1 mV for each increment of the charging/discharging cycle counter value. That is, in the specified voltage decreasing operation, the specified voltage decreases at a rate of 1 mV/cycle. Thus, in the specified voltage decreasing operation, when the charging/discharging processes are repeated for 100 cycles, the specified voltage decreases to 4.1 V. After the charging/discharging processes are repeated for the predetermined cycles, the batteries are fully charged in the constant voltage charging operation in which the specified voltage does not decreases. Accordingly, in the constant voltage charging operation, the batteries are fully charged at the specified voltage that is fixed at 4.1 V. In the charging/discharging processes, since the specified voltage gradually decreases from the beginning of battery use, it is possible to increase the actual capacity of a battery at the beginning of battery use, and additionally to effectively keep the deterioration of the battery in check so that the life of the battery can be long.

Figure 7:
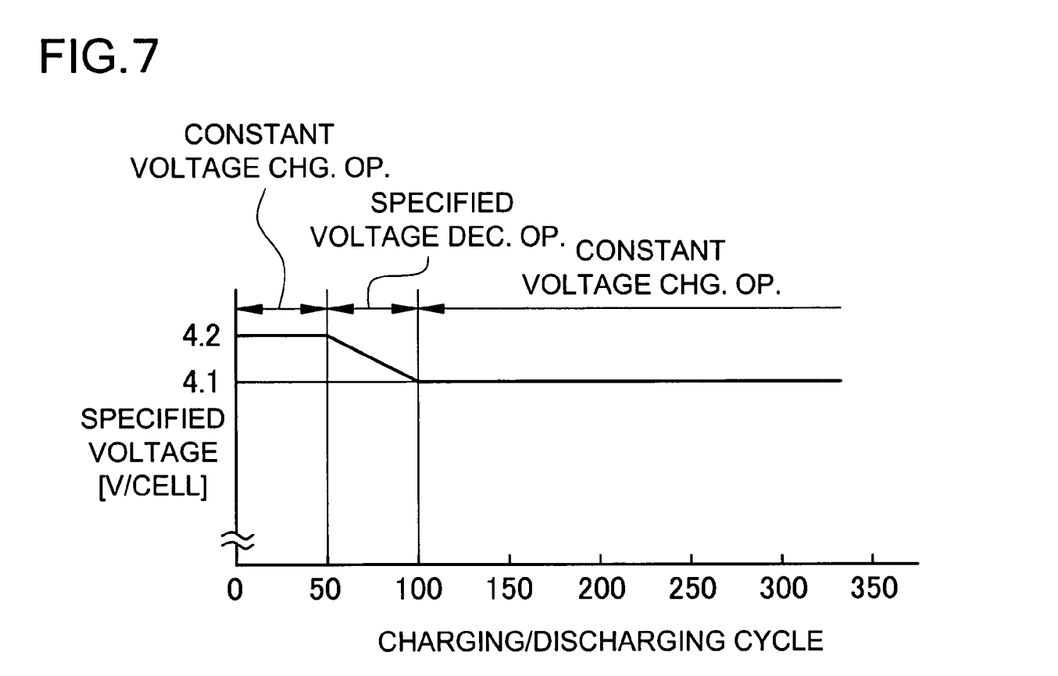
FIG. 7 is a view showing another example in which a specified voltage decreases with repetition of battery charging/discharging processes.

In a charging method shown in FIG. 7, the batteries are charged in the constant voltage charging operation at the beginning of battery use, after that, when the charging/discharging processes are repeated for predetermined cycles, the batteries are charged in the specified voltage decreasing operation. In addition, after the charging/discharging processes are repeated in the specified voltage decreasing operation for predetermined cycles, the batteries are charged in the constant voltage charging operation again. In this charging method, as the charging/discharging processes are repeated, in other words, as the number of charging/discharging cycles increases, the batteries are charged in the constant voltage charging operation, the specified voltage decreasing operation, and the constant voltage charging operation, in this order.

In this charging method, until the charging/discharging cycle counter value reaches a predetermined value, e.g., 50, the batteries are charged in the constant voltage charging operation. In this operation, since the batteries are fully charged at the specified voltage of 4.2 V, it is possible to increase its actual capacity. After the charging/discharging cycle counter value exceeds 50, and until the charging/discharging cycle counter value reaches 100, the batteries are fully charged in the specified voltage decreasing operation. In this specified voltage decreasing operation, the specified voltage is initially set to 4.2 V, and then decreases by 2 mV for each increment of the charging/discharging cycle counter value. That is, in this specified voltage decreasing operation, the specified voltage decreases at a rate of 2 mV/cycle. Thus, when the charging/discharging cycle counter value reaches 100, the specified voltage decreases by 100 mV, and becomes 4.1 V. After the charging/discharging processes are repeated for 100 cycles as the predetermined cycles, the batteries are fully charged in the constant voltage charging operation in which the specified voltage does not decreases. Accordingly, in the last constant voltage charging operation, the batteries are fully charged at the specified voltage that is fixed at 4.1 V. In the charging/discharging processes, the specified voltage is set high at the beginning of battery use, and then gradually decreases from the beginning of battery use. Therefore, it is possible to increase the actual capacity of a battery in the predetermined charging/discharging process cycles at the beginning of battery use, and additionally to effectively keep the deterioration of the battery in check so that the life of the battery can be long.

Figure 8:
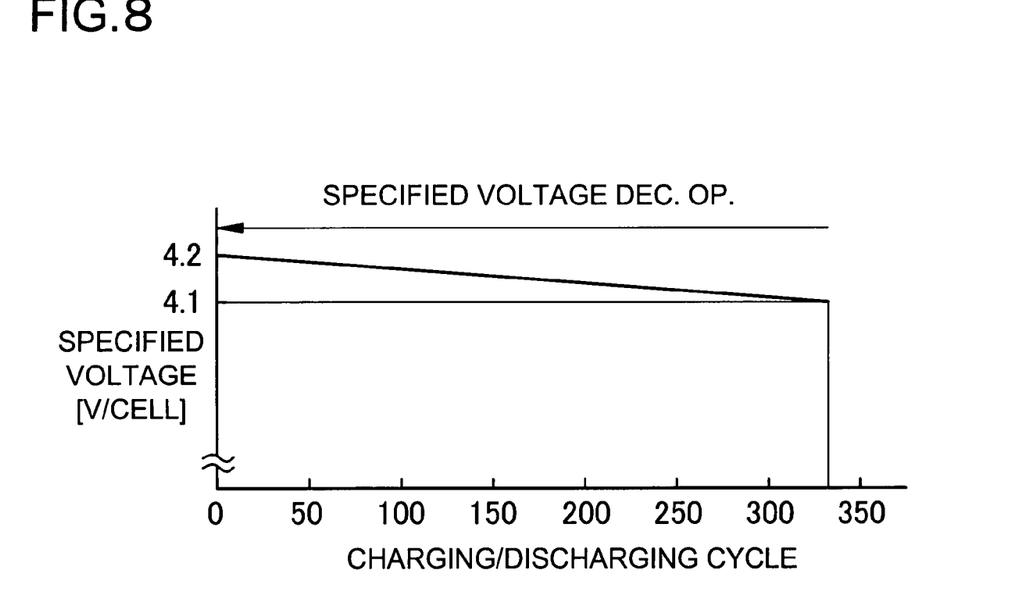
FIG. 8 is a view showing another example in which a specified voltage decreases with repetition of battery charging/discharging processes.
Figure 9:
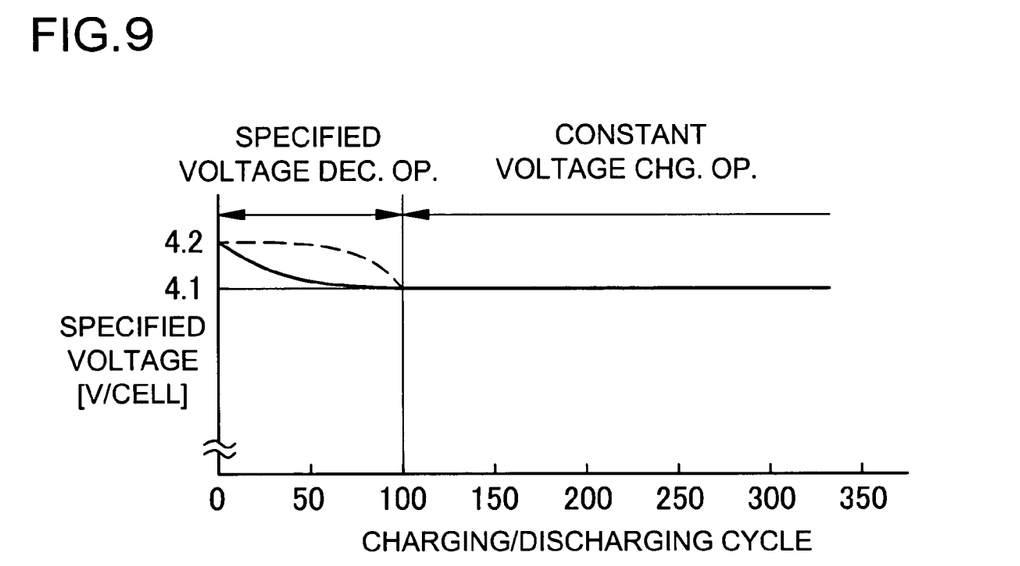
FIG. 9 is a view showing still another example in which a specified voltage decreases with repetition of battery charging/discharging processes.

In a charging method as shown in FIG. 8, batteries are charged over their life in the specified voltage decreasing operation in which the specified voltage gradually decreases as the charging/discharging processes are repeated, in other words, as the number of charging/discharging cycles increases.

In this charging method, from the beginning of battery use until the end of battery life, the batteries are charged in the specified voltage decreasing operation in which the specified voltage gradually decreases. In the specified voltage decreasing operation, the specified voltage is initially set to 4.2 V, and then decreases by 0.3 mV for each increment of the charging/discharging cycle counter value. Thus, in the specified voltage decreasing operation, when the charging/discharging processes are repeated for 333 cycles, the specified voltage decreases to 4.1 V. In the charging/discharging method, since the specified voltage gradually decreases from the beginning of battery use, it is possible to increase the actual capacity of a battery at the beginning of battery use, and additionally to effectively keep the deterioration of the battery in check so that the life of the battery can be long.

In the aforementioned charging methods, in the specified voltage decreasing operation, the specified voltage decreases at a constant rate with repetition of the charging/discharging processes, however, in the present invention, the specified voltage does not necessarily decreases at a constant rate. For example, as shown by a solid line in FIG. 9, in the specified voltage decreasing operation, the specified voltage can decreases at a rate that gradually decreases with repetition of the charging/discharging processes. Conversely, as shown by a dashed line in FIG. 9, in the specified voltage decreasing operation, the specified voltage can decreases at a rate that gradually increases with repetition of the charging/discharging processes. In addition, in the case shown in FIG. 9, after the specified voltage decreasing operation, the batteries are fully charged in the constant voltage charging operation in which the specified voltage is a constant voltage and does not vary.

Although the control circuit counts the cycle counter value that indicates repetition of the charging/discharging cycle when the batteries are fully discharged in the case shown FIGS. 6 to 9, the control circuit can integrate charging or discharging capacity amounts and thus counts the cycle counter value based on the integrated charging or discharging capacity amount value. In the method in which the cycle counter value is counted based on the integrated charging capacity amount value, the charged capacity amounts of the battery to be charged/discharged are integrated. The control circuit increments the cycle counter value when the integrated charged capacity value reaches the actual capacity of the battery at the integration action, and increments a deterioration counter value based on the cycle counter value. For example, in the case where the actual capacity of the batteries are 1000 mAh at the integration action, if capacity amounts of 500 mAh, 200 mAh and 300 mAh are applied to the battery in first, second and third charging processes, respectively, the integrated charged capacity value reaches 1000 mAh, thus, the control circuit determines that one cycle charging process is completed. In the integration action, the battery can discharged or can be fully charged. In the case where charging processes are repeated, the control circuit increments the deterioration counter value each when the integrated charged capacity value reaches the actual capacity of the battery at the integration action.

Instead of charged capacity amounts, the control circuit can count one cycle counter value based on an integrated discharged capacity value. In this method, the control circuit integrates the actual discharged capacity amounts of a battery. The control circuit increments the cycle counter value when the integrated discharged amount value reaches the actual capacity value of the battery at the integration action, and increments the deterioration counter value based on the cycle counter value. For example, in the case where the actual capacity of the batteries are 1000 mAh at the integration action, if capacity amounts of 500 mAh, 200 mAh and 300 mAh are discharged from the battery in first, second and third discharging processes, respectively, the integrated discharged capacity value reaches 1000 mAh, thus, the control circuit determines that one cycle discharging process is completed. In the integration action, the battery can be charged or can be fully discharged. In the case where discharging processes are repeated, the control circuit increments the deterioration counter value each when the integrated discharged capacity value reaches the actual capacity of the battery at the integration action.

Instead of charged or discharged capacity amounts, the control circuit can increment a cycle counter value based on an integrated value of charged and discharged capacity amounts. In this method, the control circuit integrates the actual charged and discharged capacity amounts of a battery. The control circuit increments the cycle counter value when the integrated value of the charged and discharged amounts reaches a value twice as much as the actual capacity value of the battery at the integration action, and increments the deterioration counter value based on the cycle counter value. For example, in the case where the actual capacity of the batteries is 1000 mAh at the integration action, if a capacity amount of 800 mAh is applied to the battery in a first charging process, then, capacity amounts of 500 mAh and 200 mAh are discharged from the battery in first and second discharging processes, respectively, subsequently, a capacity amount of 200 mAh is applied to the battery in a second charging process, after that, a capacity amount of 300 mAh is discharged from the battery in third discharging process, the integrated value of the charged and discharged capacity amounts reaches 2000 mAh, thus, the control circuit determines that one cycle charging process is completed.

In the aforementioned method, irrespective of whether the batteries are fully charged/discharged, the charged and discharged capacity amounts are integrated, thus, the cycle counter value is incremented, in addition, the deterioration counter value is also incremented based on the cycle counter value each when the integrated charged and discharged capacity value reaches a value twice as much as the actual capacity value of the battery at the integration action. The actual capacity value of the battery decreases as the number of the charging/discharging process cycles increases. Accordingly, the actual capacity value of the battery can be estimated based in the deterioration counter value of a deterioration counter.

According to the aforementioned method, the control circuit counts the number of the states where the batteries are charged/discharged as the "charging/discharging cycle counter value", and thus changes the specified voltage based on this cycle counter value. In this method, it is possible to accurately determine the battery deterioration condition caused by charging/discharging processes, and thus to changes the specified voltage. Accordingly, the specified voltage can be suitably changed. As a result, it is possible to improve the increase of battery life. However, the present invention is not limited to the control circuit that determines the battery charging/discharging repetition condition based on the charging/discharging process cycle counter value. For example, the control circuit can count the number of the battery charging or discharging processes to determine the battery charging/discharging repetition condition based on this counted value so that the specified voltage is changed based on the counted value. Alternatively, the control circuit can detect battery charging/discharging periods of time to determine the battery charging/discharging repetition condition based on the periods of time so that the specified voltage is changed based on the charging/discharging periods of time.

In the aforementioned method, the control circuit 13 that is installed in the battery pack 10 controls the charging switching element 14B to charge the batteries 11 to the full charged state. However, in the method according to present invention, the charging switching element 14B in the battery pack 10 can be controlled so that the batteries are charged to the full charged state by a charging circuit (not shown) that is installed in the electronic device 30 such as the mobile device PC with the battery pack 10 attached thereto. In addition, a charging circuit that charges the batteries to the full charged state can be installed in the mobile device PC, thus the charging circuit can control the charging process for the batteries that is installed in the battery pack. Additionally, in an apparatus that charges batteries to the full charged state by a charging circuit of the mobile device PC, both the mobile device PC and the battery pack control the charging process to charge the batteries to the full charged state. In this case, a specified voltage at which the charging circuit of the mobile device PC determines the full charged state of the batteries to stop the charging process is set lower than the specified voltage at which the control circuit of the battery pack determines the full charged state of the batteries to stop the charging process. In this construction, even if abnormality occurs in the charging circuit of the mobile device PC, the batteries can be charged to the full charged state at the specified voltage that is held by the control circuit of the battery pack and the charging switching element.

In the case where the charge circuit of the electronic device 30 controls the charging switching element 14B of the battery pack 10, the mobile device PC and the battery pack 10 are connected through a communication line 19. The battery pack 10 shown in the Figure includes the communication circuit 15. The communication circuit 15 of the battery pack 10 is connected to the mobile device PC through the communication line 19. The mobile device PC controls the charging switching element 14B of the battery pack 10 through the communication line 19 and the communication circuit 15. The communication circuit 15 provides the control circuit 13 with a signal that controls the charging switching element 14B. In addition, the communication circuit 15 transmits information to the mobile device PC as the electronic device 30. The information relates to ON/OFF control of the charge circuit of the electronic device 30 for the charging switching element 14B, that is, the battery voltage, the battery 11 charging/discharging current, and the like. The charge circuit of the mobile device PC controls the charging switching element 14B or a charging switching element (not shown) that is installed in this charge circuit based on the information transmitted through the communication circuit 15 so that the batteries are charged to the full charged state.

As for the method that charges batteries at the specified voltage that decreases. Although, in the above description, the specified voltage is reduced by changing the pulse charging periods of time as discussed above, the specified voltage can be reduced by using the aforementioned communication circuit 15 to reduce a specified voltage of the charge circuit of the electronic device 30.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-173673 filed in Japan on Jun. 23, 2006, the content of which is incorporated herein by reference.

What is claimed is:

1. A battery charging method that charges a battery to a full charged state at a specified voltage repeatedly, wherein the specified voltage decreases as battery charging/discharging processes are repeated by counting a number of predetermined charging and discharging cycles, the method comprising:

repeating charging of the battery in which the battery is charged at a first constant voltage during a first predetermined charging and discharging cycles;

repeating charging of the battery in which the battery is charged at a specified voltage that decreases from the first constant voltage gradually and continuously as the cycle number is counted during a second predetermined charging and discharging cycles following the first predetermined charging and discharging cycles; and repeating charging of the battery in which the battery is charged at a second constant voltage which is lower than the first constant voltage during a third predetermined charging and discharging cycles following the second predetermined charging and discharging cycles, wherein the number of predetermined battery charging and discharging cycles is counted, and the specified voltage decreases as the counted predetermined number of battery charging and discharging cycles increases, and in the repeated charging of the battery in which the battery is charged at the specified voltage that decreases, the specified voltage decreases at a constant rate and until the end of the second predetermined charging and discharging cycles.

2. The battery charging method according to claim 1, wherein the battery is charged in a constant current charging manner so that the voltage of the battery reaches the specified voltage, and the battery is then charged at the specified voltage in a constant voltage charging manner.

3. The battery charging method according to claim 1, wherein the battery to be charged is a lithium-ion rechargeable battery.

4. The battery charging method according to claim 1, wherein charging or discharging capacity amounts are integrated in the battery charging or discharging processes, and the specified voltage decreases as a value of the integrated capacity amounts increases.

5. The battery charging method according to claim 1, wherein in the repeated charging of the battery in which the battery is charged at the specified voltage that decreases, the specified voltage decreases over the battery life.

6. The battery charging method according to claim 1, wherein in the repeated charging of the battery in which the battery is charged at the specified voltage that decreases, the specified voltage decreases at a rate that gradually decreases.

7. The battery charging method according to claim 1, wherein in the repeated charging of the battery in which the battery is charged at the specified voltage that decreases, when the charging and discharging capacity amount of the battery to be charged and discharged reaches the capacity rating of the battery, the specified voltage decreases by a voltage in the range from 0.1 mV to 10 mV.

\* \* \* \* \*